(No Model.)
C. K. DICKSON.
HAME FASTENER.
No. 313,927. Patented Mar. 17, 1885.
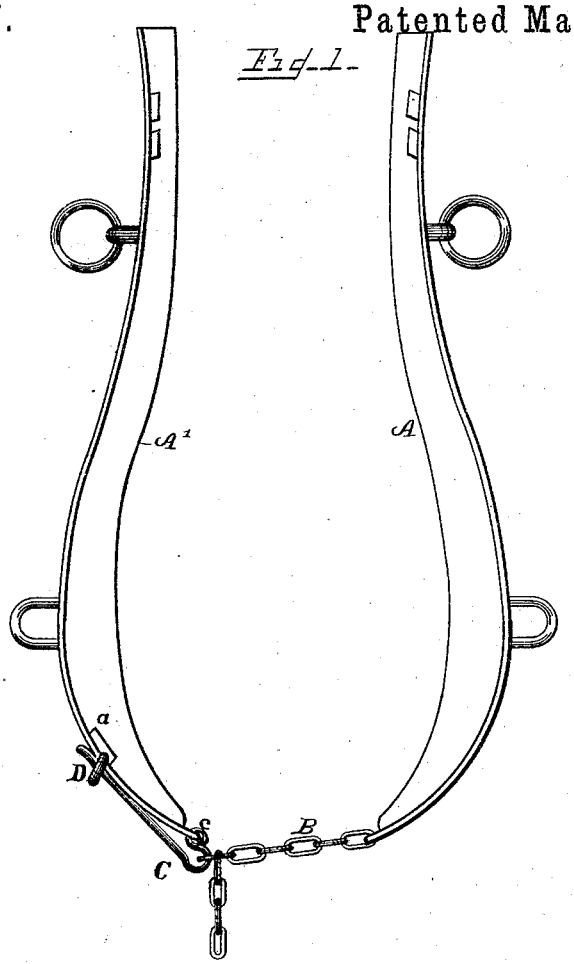
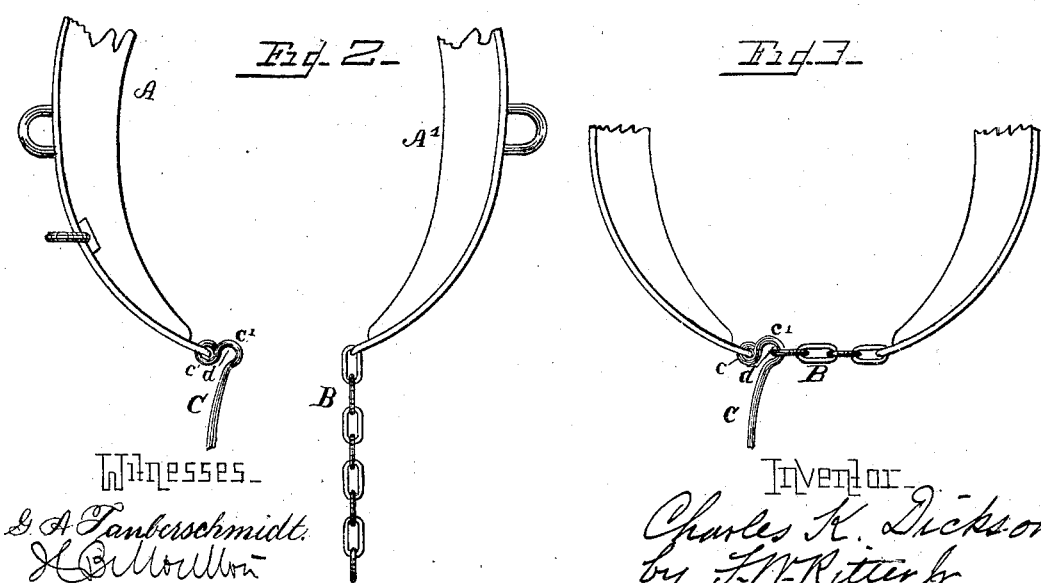

UNITED STATES PATENT OFFICE.

CHARLES K. DICKSON, OF ST. LOUIS, MISSOURI.

HAME-FASTENER.

SPECIFICATION forming part of Letters Patent No. 313,927, dated March 17, 1885.

Application filed December 10, 1883. (No model.)

*To all whom it may concern:*

Be it known that I, CHARLES K. DICKSON, of St. Louis, Missouri, have made a new and useful Improvement in Hame-Fastenings, of which the following is a full, clear, and exact description, reference being had to the annexed drawings, making part of this specification, in which—

Figure 1 is a front elevation of a pair of hames having the improvement, the hames being fastened; and Fig. 2, an elevation showing the lower ends of the hames unfastened. Fig. 3 is an elevation of the ends of the hames, showing how the irregular swell of the hook maintains the fastening when the long arm of the hook has become detached from the gravity-ring.

The same letters of reference denote the same parts.

My invention relates to the construction of that class of hame-fasteners wherein a chain or like loop and a pivoted cam-hook are employed, and has for its object, first, to reduce the fastening to the simplest practical form, and, secondly, to secure the fastening against accidental separation of the parts. As at present constructed, the strain or pull from the chain or loop of one hame is brought to bear on the locking-arm of the cam-hook, so that if said arm is freed from the loop or catch which holds it the locking-arm will inevitably be drawn around or over and the chain allowed to escape. This difficulty I overcome by giving such a swell to the hook at its curve as to bring the long or locking arm in line with the draft of the loop or link on the opposite hame, whereby the long arm of the hook has a tendency to hug the hame to which it is attached, or, if detached, the swell of the hook at its curve will still retain the loop or link of the opposite hame and preserve the fastening. This main feature, together with minor features, which will hereinafter more fully appear, constitutes the subject-matter of my present invention.

I will now proceed to describe my invention more fully, so that others skilled in the art to which it appertains may apply the same.

In the drawings, A A' indicate the two sections of the hames, to one of which a chain, B, or equivalent slotted strap, is secured, and which shall be adapted to receive the hook C, which completes the fastening.

Pivoted by its short arm to the opposite hame is a hook, C, of peculiar construction— that is to say, said hook at its curve $c'$ has its swell increased, or, in other words, the two arms of the hook approach at the point of pivoting, $c$, so that the inclosed space $d$ more nearly resembles a circle than a hook, whereby should the hook C assume the position shown in Fig. 2 the draft would be directly on the pivotal point, and not on the long arm of the hook, so that the fastening-chain B would still retain its position in the curve of the hook, and thus retain the hames in position.

In order to secure the long arm of the pivoted hook C when the same is in the position shown in Fig. 1, I employ a sliding gravity-ring, D, which ring passes through an elongated slot, $a$, made in the hame.

In making the fastening the long arm of hook C is passed through the desired link of chain B and then turned up toward the hame to which it is attached until the link of the chain slips into the swell $d$ at the curve of the hook. This brings the strain on the hame rather than on the long arm of the hook. The gravity-ring D is then slid up in the slot $a$ until the end of the hook C can be entered in the ring, when the ring is pushed or allowed to slip down, and will retain its position by gravity. The result of pivoted hook C being provided with a swell or pocket, $d$, at the point of bearing of the locking-chain B is, that should by any accident the long arm of pivoted hook C become detached from gravity-ring D the chain would still remain linked to the pivoted hook C, as shown in Fig. 3.

I am aware that in shoe-fasteners a cam-hook has been used in conjunction with a slotted strap, the hook being pivoted on a spring, which held the hook in position when the fastening was made, and do not herein claim the same, as my invention differs from the above in giving to the curve of the hook an irregular swell, which brings the draft in the line of the hame and not on the long arm of the hook, so that springs or like fastenings may be dispensed with.

Having thus described the nature, construction, and advantages of my invention, what I claim, and desire to secure by Letters Patent, is—

1. In a hame-fastener, the combination of the hame-sections A A', chain B, pivoted hook C, having the irregular swell or pocket $d$ at the curve of the hook, and the long arm, gravity-ring D, and gravity-ring slot $a$, substantially as described, and for the purposes specified.

2. In a hame-fastener, the combination of hame-section A, having chain B firmly attached to its lower end, a hame-section, A', having an elongated slot, $a$, and sliding gravity-ring D, a pivoted hook, C, pivoted to lower end of hame-section A', and having an irregular swell or pocket, $d$, adapted to receive and hold one end of chain, and the long arm adapted to establish connection with chain B and to be locked by gravity-ring D, substantially as described.

In testimony whereof I have affixed my signature, in presence of two witnesses, this 4th day of December, 1883.

CHAS. K. DICKSON.

Witnesses:
   PAUL BAKEWELL,
   FERNANDO SAUTER.